United States Patent [19]

Lenberg

[11] Patent Number: 5,170,992

[45] Date of Patent: Dec. 15, 1992

[54] STOP VALVE

[75] Inventor: Lars Lenberg, Nossebro, Sweden

[73] Assignee: Tour & Andersson AB, Johanneshov, Sweden

[21] Appl. No.: 798,022

[22] PCT Filed: Apr. 20, 1989

[86] PCT No.: PCT/SE89/00219

§ 371 Date: Oct. 22, 1990

§ 102(e) Date: Oct. 22, 1990

[87] PCT Pub. No.: WO89/10507

PCT Pub. Date: Nov. 2, 1989

Related U.S. Application Data

[63] Continuation of Ser. No. 598,720, Oct. 22, 1990, abandoned.

[30] Foreign Application Priority Data

Apr. 21, 1988 [SE] Sweden .............................. 8801490

[51] Int. Cl.[5] .............................................. F16K 5/00
[52] U.S. Cl. ..................................... 251/304; 251/87; 251/314
[58] Field of Search ............... 251/304, 314, 316, 298, 251/288, 315, 86, 87

[56] References Cited

U.S. PATENT DOCUMENTS

| | | | |
|---|---|---|---|
| 3,326,514 | 6/1967 | Riley | 251/87 |
| 3,379,408 | 4/1962 | Lowrey | 251/298 |
| 4,006,883 | 2/1977 | Hilsheimer | 251/314 X |
| 4,150,811 | 4/1979 | Condit | 251/298 X |
| 4,193,578 | 3/1980 | Brumm | 251/304 X |
| 4,218,042 | 8/1980 | Eckel | 251/288 |
| 4,260,129 | 4/1981 | Groenfeld | 251/88 X |
| 4,399,976 | 8/1983 | Legris | 251/315 X |
| 4,506,696 | 3/1985 | von Pechmann | 251/316 X |
| 4,822,000 | 4/1989 | Bramblet | 251/298 |

Primary Examiner—John C. Fox
Attorney, Agent, or Firm—Dann, Dorfman, Herrell and Skillman

[57] ABSTRACT

A stop valve (1) comprises a housing (2) having a passage (15) for a reversible medium flow, which can be stopped by means of a valve body (20) having an annular portion of a sphere as a sealing surface (25) and a flat end portion (26). The transfer area between said sealing surface (25) and said flat end portion (26) having a very small bending radius (r) and the spherical radius (r1) of said sealing surface (25) is smaller than the turning radius (r2) of said valve body. The valve body (20) cooperates with a sealing ring (36), which is annular and surrounds the passage and has an annular body (37), which via a constriction (38) merges into a seat ring (39). The sealing ring (36) is, in the closing position of the valve, exposed with a smaller portion to that passage section, which houses said valve body, and with a larger portion to the other passage section. The mounting of said valve body (20) cooperates with a sealing ring (36), which is annular and surrounds the passage and has an annular body (37), which via a constriction (38) merges into a seat ring (39). The sealing ring (36) is, in the closing position of the valve, exposed with a smaller portion to that passage section, which houses said valve body, and with a larger portion to the other passage section. The mounting of said valve body has play which allows a position adjustment in the direction of said seat but not in the direction away from the seat.

12 Claims, 3 Drawing Sheets

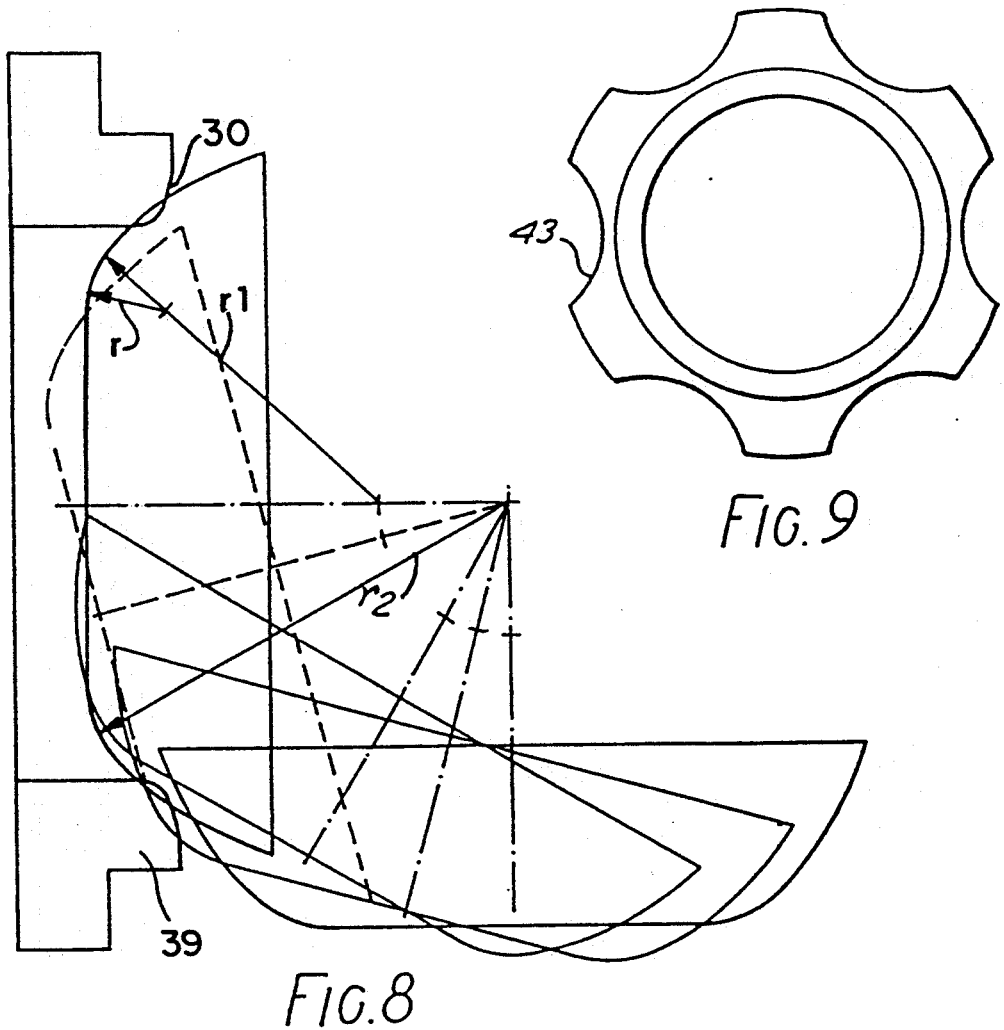
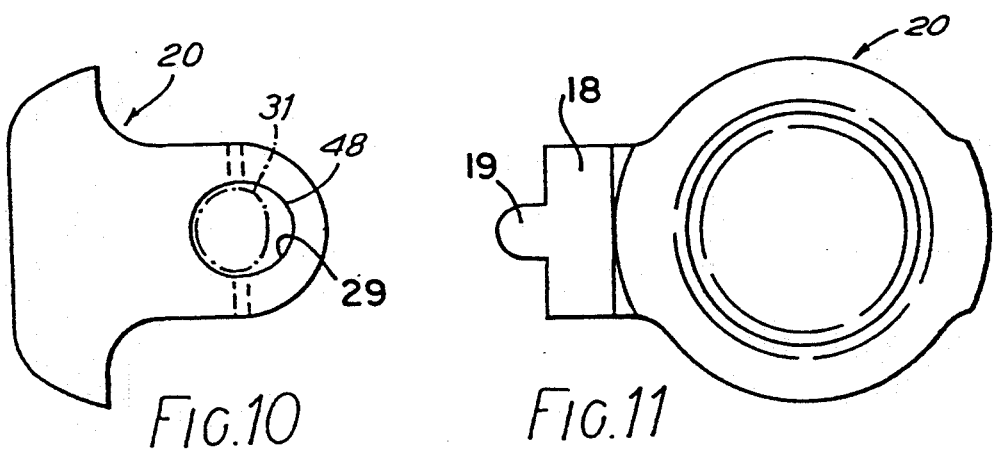

STOP VALVE

This is a continuation of copending application Ser. No. 07/598,720, filed Oct. 22, 1990 now abandoned.

The present invention relates to a stop valve of the type having a cup-shaped valve body cooperable with an annular seat in the flow passage and rotated about an axis perpendicular to the flow passage. The valve body is rotated in the housing by a spindle having a handle outside the housing.

The cap-shaped valve body of such valves causes a few problems, which are hard to remedy. The cap e.g. is to cooperate with a seal during an extended period of time, resulting in a preferably constant sealing action. Also, the pressure of the medium, which is to be controlled, must not open up/shut the valve body unintentionally. To the extent that there is no unambiguous exterior indication of the position of the valve body, it is difficult to know the precise control position. Another problem resides in the fact, that it often is desirable to be able to control a flow in opposite directions, while the desirable properties of the valve are maintained. An additional almost paradoxical problem is that the valve body, i.e. the cap, is to provide a satisfactory sealing irrespective of the direction of flow and the pressure of the medium and yet be easily controllable. Finally, the conventional stop valves require often a lengthy, tedious and expensive mounting process, a so called automatic mounting being almost impossible. Despite this length, tedious and expensive process several of the known valves constitute safety risks, since leakage and/or disintegration under pressure may occur.

A valve of the stated type is previously known by U.S. Pat. No. 4 257 576. The concept of this previous invention is to design a shut-off member large in relation to a passage way into which it is to be fitted through one of two connecting ends of a valve housing which is made in one piece. FIG. 16 of this specification reveals the way of mounting the shut-off member within the valve housing. As can be seen, the shut-off member has to be obliquely engaged in the main bore of the valve housing until an upper lug of said member arrives within a diverting spindle bore, while a lower, forked lug has to be engaged on a stub which previously has been secured to the housing as has a sealing gasket provided to co-operate with the shut-off member. Then, the latter is to be straightened rocking into a non-operative position, which is the only way to insert the shut-off member, which then has to be turned 180°, whereupon the spindle is inserted on to the upper lug.

It can hardly be argued, that such a concept requires a fair amount of difficult and time consuming manual assemblance work. In spite of this, the mode of operation and reliability of a valve of this kind must be questioned. Firstly, when having succeeded to insert the shut-off member, straightening and turning it to its right shut-off position, this will have to be achieved against resistance and friction offered by the sealing gasket, most probably manually, as the spindle is to be inserted but after the 180° turn of the shut-off member. Anyway, it would hardly be possible to insert the spindle before, as the shut-off member is designed to be turned 90° only. This means, that there must be a considerable play between gasket and shut-off member in order to have the latter slide along the gasket with the aid of a hand or some tool only. Secondly, the fork-shape of the lower lug, which shape is a must, is a considerable disadvantage, as in this way the shut-off member can exert an uncontrolled pressure on the gasket and damage or even blow away same at occasional high pressures like an ordinary shock-wave, which in a lever-like way is concentrated just and only on the gasket area juxtaposed the lower lug. Simultaneously, the upper lug may be damaged, if not the entire shut-off member. Undoubtedly, due to this design, there is a high wear of the said gasket region, and sooner or later the gasket sealing won't operate any longer in the desired way. With the wore-off gasket region, the shut-off member won't attain a straight position any longer, but will be more and more oblique and continue to wear-off the said gasket area, until the valve ceases to function properly. Malfunctions which easily may occur with this valve are non-desired self-opening and/or closing.

Also, using a valve housing made in one piece will initially save very little money, which then will turn into high extra costs for extraordinary difficult and costly assembling or disassembling. Any subsequent inspection is impossible without firstly removing the valve housing from at least one connection pipe. Furthermore, there remains always the risk of a so called blow-out of the spindle at very high pressures, as the spindle is insertable from the outside in relation to the passage-way only. Last not least, this valve cannot be used for fluid flows in opposite directions, i.e. the direction of fluid cannot be turned, as the sealing gasket never would be sealingly affected and would tend to leave its position during the opening or closing movement of the shut-off member. Finally, the various shapes and modes of mounting the sealing gasket make obvious, that sealing properties, life time etc do not meet with high standards. The same may be said of the various shapes and reinforcements of the shut-off member. In open position, which is shown in FIG. 7 in the said specification, the shut-off member is not, of course, prevented by the lower lug with open fork from being pushed further to one side and may even be subjected to vibrations or fluttering, while a subsequent shutting movement will have to take place against the fluid flow pressure, which means, that the fork may be more or less disengaged from the stub and the sealing gasket will be affected extra much and non-uniformly.

The object of the invention is to counteract and as far as possible overcome the above-mentioned problems and to suggest a stop valve, which also in additional respects is conducive to technical progress in this field.

This object is attained, according to the present invention, by designing a stop valve of the type discussed above with the curvature of the spherical surface eccentric to the axis of rotation of the valve body.

A so designed stop valve is considered to be very advantageous in various respects. As can be seen from FIG. 4 of the attached drawings, the valve body does not obstruct or minimize any of the cross-sectional area of a passageway. Also, it is possible to insert, inspect and remove a unit consisting of spindle, valve body and a lid with a bearing pin with both ends of the valve housing connected to pipes. There are no turnings or rockings of the valve body at all and the said unit can be fitted in a more or less coherent state. Once it is fitted, the valve body, being in proper closing position, offers itself in an excellent way for properly positioning and fitting of the sealing ring, the sealing carrier and the lock ring, which all can be mounted easily, safely and in a very speedy manner. Furthermore, as the spindle is inserted from the inside of the valve body, as both ends of the valve body are positively secured all around, and as the lid carrying the said unit may project into the interior of the valve housing with a minor part, which thus is affected by a minor pressure while the exterior part of the said lid may be designed with a relatively large diameter and thus a considerable locking force, there is no risk for a so called blow-out even at very high pressures, which occasionally may occur in most valves.

As the valve body is provided to be inserted into the valve housing prior to mounting the sealing gasket, there is no problem whatsoever with obstruction, resistance and friction forces offered by the sealing gasket. Instead, the prior mounting of the valve body will favour the subsequent mounting of the sealing gasket with accessories as previously mentioned. When mounting the sealing gasket with accessories, this can be done at any desired compression or friction forces created by the sealing gasket, as the latter and its accessories may all be mounted in one straight mounting operation, the pushing force of which easily may be chosen adequate to lock all parts safely in their intended position. Although, due to these characteristics, a so called blowout positively may be prevented, it is easily possible to design particularly the lock ring and the groove holding same, in such a way, that they will give way above a certain pressure level, e.g. for reasons of security. Normally, this is, of course, not necessary and the valve according to the invention will resist any medium pressures without having any part damaged due to such pressures. It will be appreciated, that reinforcements or any special designs of e.g. the valve body may be completely avoided due to the overall design mentioned. All parts of the valve according to the invention may be designed without any play or with a certain play, which is unimportant due to the characteristics of the invention, which make any special consideration unnecessary. Even a certain wear of any part, the sealing gasket and the valve body in particular, won't render the valve less operative, as the design according to the invention incorporates per se compensation for wear and play. Unintentional self-opening and/or self-closing are practically impossible. The valve body is safely held both in opening and in closing position and this regardless of the direction of medium flow. This means, that without any problems the direction of medium flow may be reversed and in such a case, again due to the characteristics according to the present invention, all properties of the valve will be maintained, in particular a reliable sealing operation in closing position.

Additional characterizing features and advantages of the present invention are set forth in the following description, reference being made to the accompanying drawings, which partly schematically show a few preferred, all the same not restricting embodiments and which show in detail:

Figure 1:
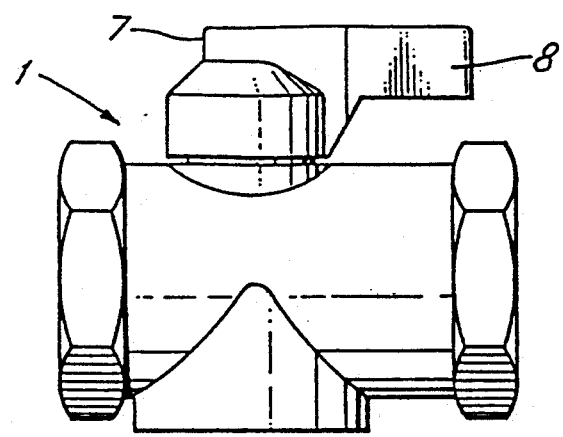
FIGS. 1-5 show a stop valve according to the invention, in a lateral view, a view from below, a view from above, and views of its two ends.

FIGS. 7(a) through (e) show a sequence of the cap movements from the closing to the opening position;

FIG. 8 shows the positions according to FIG. 7, transferred to one and the same figure on a larger scale;

FIG. 9 an axial view of the seal carrier on a large scale from the right in FIG. 7; and FIGS. 10 and 11 said cap, shown from below and from the left respectively in FIG. 6.

In the drawings a stop valve 1, taken as a whole, comprises a housing 2 and two connection ends 3 and 4, which can be designed as exterior hexagon heads having an interior threading 5 and 6 respectively. On one side of the housing, e.g. roughly in the middle of it, there is a control element 7, suitably a handle, arm 8 of which being used as a position indicator for a valve body, which will be described below. Said control element is, e.g. via a screw 9, attached to the exterior end of a spindle 10, which is hollow projection 11 on housing 2, e.g. having a sliding plate 12 in an axial direction between an exterior spindle stop and an interior flange at the end of said projection as well as an 0-ring 13 around the middle of said spindle. The spindle is extended, with a control end 14, somewhat into a passage 15 for the medium to be controlled and formed by said housing. Said control end is provided with partly a diametrical groove 16 and partly a central and axial hole 17, designed to accommodate a rotary tongue 18 and a guide pin 19, which projects from said tongue, respectively, to a valve body designed, as a whole, as a cap and designated 20.

In order to transfer movements from said control element to said spindle the latter is provided with a square element 21, which projects from the housing and matches a corresponding cavity 22 in said control element. Furthermore, in order to limit/define the opening and closing movements respectively the housing may be provided with a stop lug 23, which cooperates with two stop surfaces 24 on said control element, which stop surfaces can be designed having an angular positional difference of roughly 90°.

Figure 4:
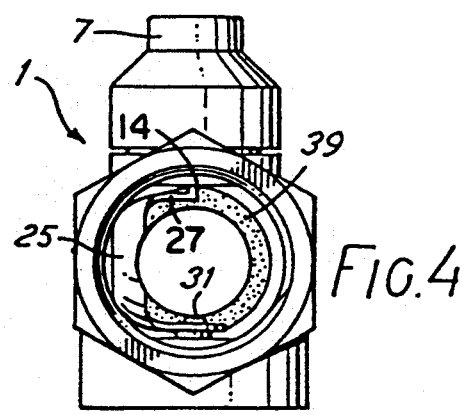

Cap 20 has an outer sealing surface 25 (see FIGS. 4 and 6), which constitutes a portion of an imaginary sphere and which has an annular shape, confining a flat, closed end portion 26. At the top of FIG. 6 a transfer arm 27 projects from this annular sealing surface and is extended in a roughly horizontal direction adjacent to the free end surface on control end 14 and meshes, by means of said tongue 18, in said groove 16, and by means of said guide pin in said hole 17.

Figure 2:
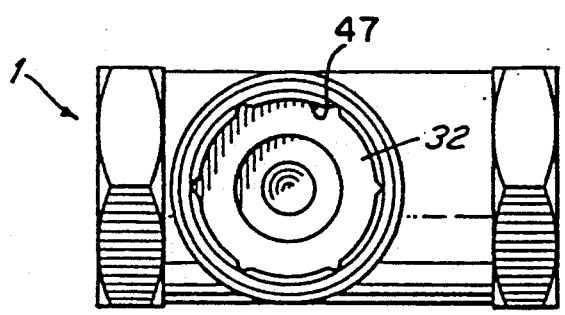
Figure 3:
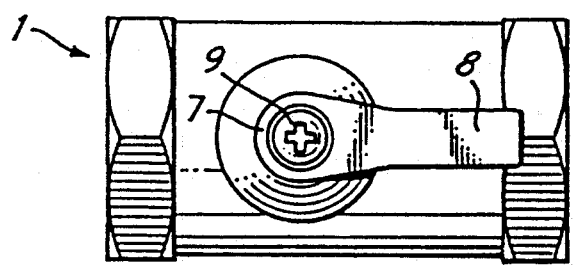

On the diametrically opposite side a bearing arm 28 projects from the annular sealing surface in the same direction and is somewhat longer than said transfer arm and somewhat eccentric as compared to hole 17 and provided with a bearing drilling 29. The eccentricity may in a practical embodiment be as high as about 5% and be directed away from a seat 30, with which said cap is designed to cooperate. Said bearing drilling 29 is designed to receive a bearing pin 31, which projects upwardly from the interior of a lid 32, which is threaded into a threaded drilling 33 in a wider projecting portion 34 of the housing, which is used as a mounting opening for said spindle and said cap. Said lid may be hollow on its outer side (see FIG. 2) in order to form in the cavity engagement elements/surfaces 47 for a tool, e.g. a wrench (not shown). Said bearing pin 31 projects preferably into said medium passage and is designed to be surrounded with play by bearing drilling 29, which due to said eccentricity and the pressure/elasticity of seat 30 abuts against the pin on the seat side, while the play manifests itself as an opening 48 (see FIG. 10) mainly on the opposite side. Also however, if desirable, drilling 29 may be somewhat oblong having a longitudinal extension in the axial direction of said passage. Said pin 31 may instead be wider in the cross-direction of said passage than in its longitudinal direction to provide the designed play in the form of a crescent-shaped space within the opening 29 between the pin 31 and the end of the drilling opening 29 farthest from the seat 30.

Between arms 27 and 28 said annular sealing surface 25 is provided with a recess 35 on each side. Said recesses are comparatively flat. They are designed to, in a completely open position, allow a free and unobstructed flow through seat 30 (see FIGS. 4 and 7e).

Figure 6:
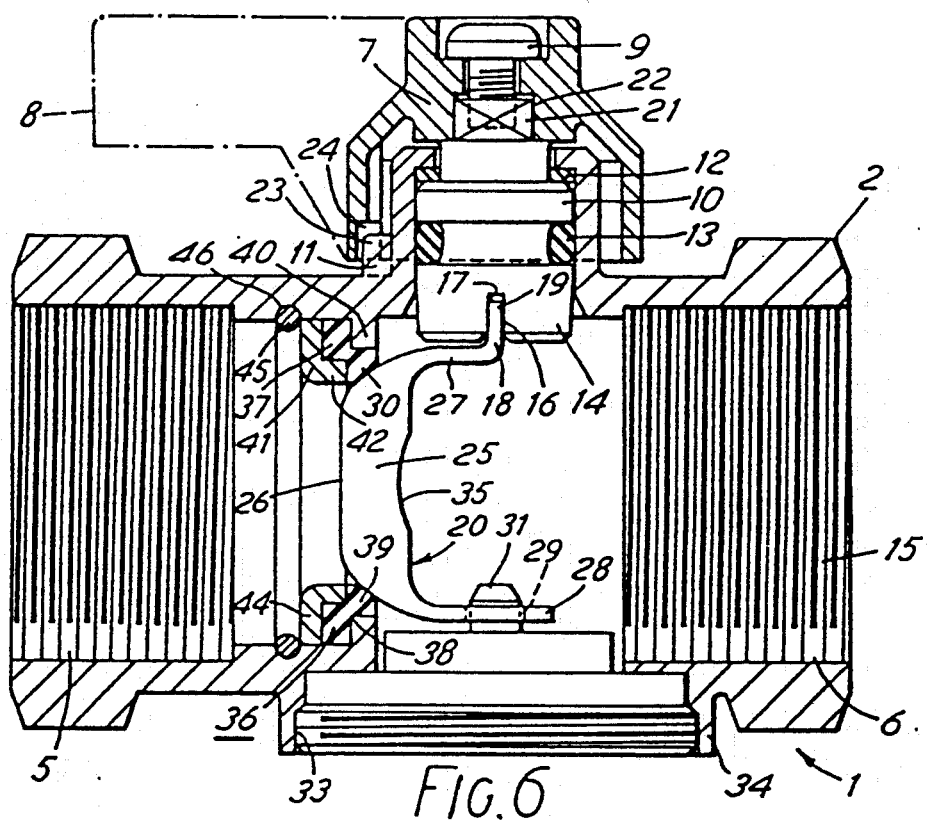
FIG. 6 shows a diametrical longitudinal section of the valve according to FIGS. 1-5 in its closed position.

Seat 30 comprises an annular sealing 36, preferably made of rubber and having the cross-section shape shown in FIGS. 6 and 7. Said sealing has an annular body 37, which may have a rectangular cross-sectional shape and which via a continuous circular constriction 38 merges into a seat ring 39 having a smaller diameter. The annular body 27 is concentric with and surround the flow passage in the housing 2, but it projects inwardly somewhat and forms, on the side which faces away from said housing, seat 30, which preferably is a bend of the free corner, which is facing away from said constriction.

Figure 5:
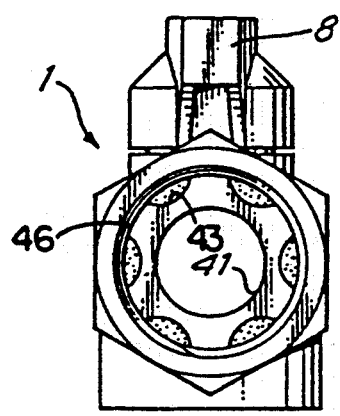

In the direction of said cap said body is supported with an axial limit surface by a flange 40, which projects into said passage and is a portion of said housing and against the interior side of which said seat ring abuts with its envelope surface. On that side which faces away from said cap a sealing carrier 41 is pressed into said passage. Said carrier is axially supported with a closed cylindrical portion 42 by that side of the seat ring, which faces away from said seat and in a radial direction outwardly against the inner side of said body, while a circular continuous collar 44, provided with holes 43 (see FIGS. 5 and 9), is supported by that side of said body, which is directed away from said seat ring, and is fastened, in this position, by means of a lock ring 45, which is pressed into a circular continuous groove 46 in said housing.

Figure 7A:
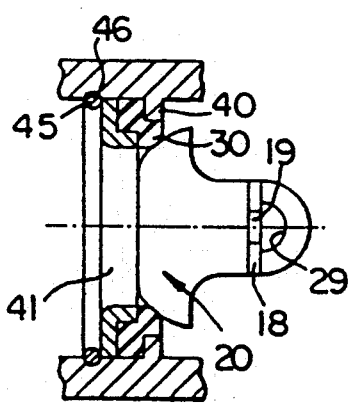

In the position shown with continuous lines in FIGS. 6, 7a and 8 said cap occupies its closing position diametrically in relation to and completely blocking said passage 15. The annular sealing surface circumferentially deforms in this way seat 30 elasticly according to FIG. 8, a satisfactory sealing action being attained. This elastic deformation partially is a condition for an exact utilization of the eccentricity described above, which however also or actually in principle can be utilized by the medium pressure in said passage, e.g. the pressure against the inner side of said cap, i.e. in the direction of said seat. Due to said eccentricity and the performed bearing drilling respectively, said bearing drilling having a designed play relative to the diameter of said bearing pin, said cap can, when substantial pressures are used with an effect in the direction of said seat 30, be displaced also towards said seat and furthermore compress said sealing ring, simultaneously improving the sealing action between said cap and said seat. Said bearing drilling then is displaced somewhat as compared to said bearing pin. In case such a displacement possibility had not existed, then the medium pressure could have compressed the sealing ring and a leakage between seat 30 and sealing surface 25 could have resulted.

In case the medium pressure is pressing in the opposite direction, then it acts primarily on said cap, which however, due to the eccentric conditions described above, does not yield, when said bearing drilling on the seat side closely contacts said bearing pin. However, the medium pressure upstreams does not act solely on said cap but via holes 43 also on sealing body 37, which is compressed and exerts a pressure via constriction 38 on seat ring 39, which is compressed from within and increases the pressure on sealing surface 25 via seat 30. In this way a satisfactory sealing action is attained also when the pressure is very high or is an overpressure.

Thanks to the described and shown design of the sealing, it is always firm and securely fastened and simultaneously it is capable of performing the described functions.

Figure 7B:
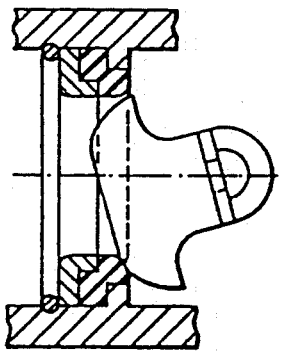
Figure 7C:
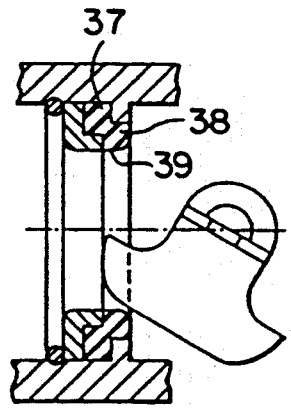

If now said valve is to be opened up, then the forward portion of said sealing surface 25 in the turning or opening direction exerts a compression pressure on the respective portion of said ring 39, which is clearly shown in FIG. 8 in the lower corner to the left, while on the opposite side a disengagement from seat ring 39 takes place. This means, that said cap in the closing position indicated with lines in FIG. 8 is in a position of equilibrium, in which seat ring 39 circumferentially centers and holds said cap. As shown in FIGS. 7a and 7b, an alteration of this position can solely be done by overcoming a resistance, which said seat ring is responsible for in said forwardly placed opening area and consequently an opening of said valve is possible only via a stronger compression of said seat ring, and in this way a portion of the compressed material of said seat ring can be displaced via said constriction 38 to said body 37. When the opening up is continued from the position indicated in FIG. 8 with dotted lines and shown in FIG. 7c, the maximum compression area of said seat ring is passed, the yielding resistance by the ring is overcome, and subsequently fairly quickly a snap-in assistance cf the continued opening up movement takes place, the last contact portion of said seat ring thus being instrumental in a way in a repulsive movement regarding said valve body.

Figure 7D:
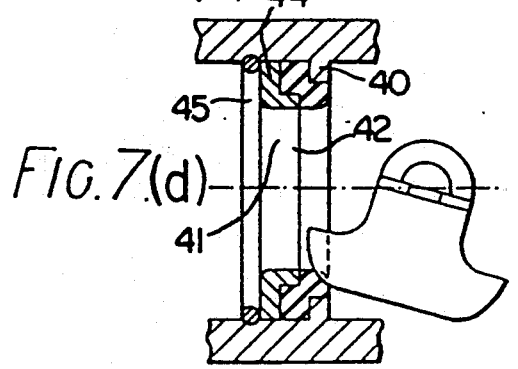
Figure 7E:
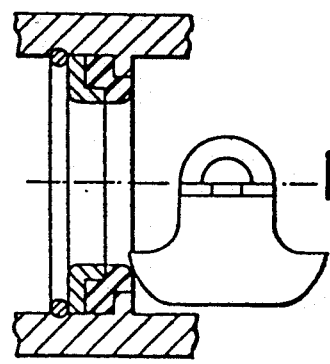

In the positions between FIGS. 7b and c the opening up movement is not obstructed by said seal ring, but this occurs again in the positions according to FIG. 7d, in which that area of sealing surface 25, which trails in the opening direction, will contact the already described compressed area, in which anew a corresponding compression takes place, since the forwardly and backwardly placed areas of said valve body, in the opening direction, occupy completely analogous positions regarding said seat ring. In order to attain a completely opened up position according to FIG. 7e said valve body with its area, which trails in the opening direction, must overcome the resistance caused by said seat ring and also in this case finally a snap-like disengagement or repulsion to the completely opened-up position according to FIG. 7e occurs.

When the valve is closed, the mode of procedure and the existing conditions are exactly opposite. Of course, the "opening snap" can be noticed best, when a complete or almost complete disengagement from said seat ring has occurred.

This means, in a tangible manner, that the closing and the opening up of the valve also is indicated in a clearly noticeable way, which is an appreciated advantage and also guarantees that said valve body cannot quite easily be displaced from its opening or its closing position.

According to the invention the described functions are attained in a most advantageous way, provided the transfer area between sealing surface 25 and said flat portion 26 has a smaller transfer radius r than rotational radius r2 of sealing surface 25. In a practical embodiment, which also illustrates the relationships between said radii, the following values apply: $r1 = 10$ mm, while r2=13 mm and r=3 mm. In this connection r1 designates the radius of the partly spherical sealing surface 25, while r2 designates the maximum action radius of said valve body. The ratios between r:r1:r2 consequently are 3:10:13. Of course, each one of said variables can be altered within certain scopes, e.g. by a 20% reduction and a 20% increase individually.

The present invention is not restricted to the shown and described features, but modifications and supplementary alterations can be done in an arbitrary way within the scope defined by the following patent claims.

Thanks to lid 32 and its particular design, bearing pin 31 being provided on its inner end, an automatic mounting is feasible without any problems. When accomplishing this, spindle 10 and associated plate 12 and 0-ring 13 can be inserted through the hole in projection 34, subsequent to which said valve body can be inserted in the same way. The position of groove 16 in mounting end 14 can be determined simply firstly by designing an insertion tool (not shown) with a shape which is more or less identical with tongue 18 and pin 19 and secondly by easily retaining said spindle exactly in its predetermined position by means of handle 8 or the like, adjusted in its correct position. Subsequently, valve body 20 is inserted, while drilling 29 and possibly arm 28 easily can occupy an exact insertion position on any suitable insertion tool, the result being that tongue 18 and pin 19 safely can be guided into said mounting end of the spindle. Subsequently, a carrier element (not shown) can hold said valve body in place in its closing or its opening position, while said lid is screwed on and pin 31 penetrates drilling 29. In connection with this or even earlier elements 36, 41 and 45 can be inserted through the threaded connection end 5 and be fastened simply and quickly.

It is also advantageous, that sealing carrier 41 has been inserted in a way "freely floating" in said passage, which partly facilitates an automatic mounting and partly renders it possible to some extent to brake the pressure shocks in the respective parts of the passage due to the fact that a sudden overpressure can displace said sealing carrier somewhat in the direction of said valve body, said sealing ring being compressed. In extreme cases the described and shown design comprising a seal, a sealing carrier and a lock ring may also be used as a safety device for extreme overpressures in that passage portion, which encompasses the valve body, in which case e.g. an extreme pressure shock may influence the sealing ring, which in its turn may compress the sealing carrier, which may displace lock ring 45, which is dimensioned for the existing purpose, groove 46 possibly being comparatively flat.

I claim:

1. A valve comprising a housing having a medium passage with an annular seat within the passage, a valve body provided with a partly spherical sealing surface at one end which co-operates with said annular seat to close and open said passage, which seat comprises an elastomeric ring, a spindle operable to rotate said valve body on a rotary axis transverse to the medium passage between closed and open positions, and a transfer arm on said spindle external to said housing for actuating the valve body and indicating its position, the improvement wherein said spherical surface portion of said valve body has a center of curvature which is eccentric to said rotary axis, and said housing, opposite said spindle, has a bearing pin projecting into the passage and supporting said vale body for rotation between said closed and open positions, said valve body having an opening engaged on said bearing pin, said pin abutting the opening on the seat side and provided with a limited designed play on the side opposite the seat side, whereby said body can move relative to said elastomeric ring at over-pressures and/or when wear or the like has occurred to allow the body to move somewhat closer tot he valve seat and improve its sealing capacity, said limited designed play between said pin and said opening on the opposite side being small enough to prevent a blow-out of valve body and seat at extreme pressures said limited designed play also limiting transverse displacement of said valve body when in the open position, said elastomeric ring operable to be compressed all around and retain the valve body in a centered position and yieldingly resist rotation of said eccentric spherical portion away from and into said closed position.

2. A stop valve according to claim 1 wherein said valve body is provided with a flat central portion within said spherical surface at said one end.

3. A stop valve according to claim 2, the spherical sealing surface having the shape of a ring surrounding said flat central portion, a transition area between said sealing surface and said flat portion having a considerably less radius r than the spherical radius r1 of the sealing surface.

4. A stop valve according to claim 3, wherein said spherical radius r1 of said sealing surface is smaller than the turning radius r2 of said valve body on said rotary axis, the ratios between r:r1:r2 being approximately 3:10:13.

5. A stop valve according to claim 1, wherein said valve body on each side is provided with a recess, said body recesses being aligned with said annular seat to allow a free flow through said seat in the open position of the valve.

6. A stop valve according to claim 1, wherein said elastomeric ring comprises an annular body with a rectangular cross-section, and a circumferential constriction merging into a seat ring having a smaller diameter.

7. A stop valve according to claim 6, said housing having a circumferential flange which projects into said passage at one side of said annular body, and a groove on the other side of said annular body, said valve including a sealing carrier having recesses and positioned between said annular body and said groove, and a lock ring retaining said annular body and said sealing carrier in said passage, said lock ring engaging into said circumferential groove in said housing.

8. A stop valve according to claim 6, said annular body being exposed towards its part of said passage with a considerably larger surface than said seat ring towards its part of the passage.

9. A stop valve according to claim 1, wherein the spindle has an exterior spindle stop, said housing having a hollow projection diametrically opposite said bearing and surrounding said spindle between said valve body and said external transfer arm, and an O-ring around said spindle engaging the hollow interior of said projection.

10. A stop valve according to claim 9, wherein said spindle stop comprises two stop surfaces on said transfer arm having an angular separation of approximately 90 degrees, and a stop lug on the housing co-operating with said two stop surfaces.

11. A stop valve according to claim 1 wherein said housing has a threaded opening opposite said spindle affording introduction of said valve body into said passage, and including a lid threaded into said threshold opening of said housing, said pin being mounted in said lid.

12. A stop valve according to claim 1 wherein at least one of said pin and said opening is oblong, whereby said designed play is a crescent-shaped space within said opening normally at the side farthest from said seat.

* * * * *

UNITED STATES PATENT AND TRADEMARK OFFICE
CERTIFICATE OF CORRECTION

Page 1 of 2

PATENT NO. : 5,170,992

DATED : December 15, 1992

INVENTOR(S) : Lars Lenberg

It is certified that error appears in the above-indentified patent and that said Letters Patent is hereby corrected as shown below:

On the Title page, item [57]

IN THE ABSTRACT:
   Line 17, after "body" delete the rest of the line;
   Delete lines 18-23 in their entirety;
   Line 24, delete "passage section. The mounting of said body";

Column 1:

Line 31, "length" should be --lengthy--;

Column 4:

Line 12, after "which is" insert --mounted in a--;

Column 6:

Line 17, after "with" insert --full--;

Column 8:

Line 3, "vale" should be --valve--;

UNITED STATES PATENT AND TRADEMARK OFFICE
CERTIFICATE OF CORRECTION

PATENT NO. : 5,170,992
DATED : December 15, 1992
INVENTOR(S) : Lars Lenberg

It is certified that error appears in the above-indentified patent and that said Letters Patent is hereby corrected as shown below:

COLUMN 10

Line 1, "threshold" should be --threaded--.

Signed and Sealed this

Ninth Day of November, 1993

Attest:

BRUCE LEHMAN

Attesting Officer

Commissioner of Patents and Trademarks